M. J. YODER.
TRAILER.
APPLICATION FILED FEB. 10, 1917.
1,247,201.
Patented Nov. 20, 1917.
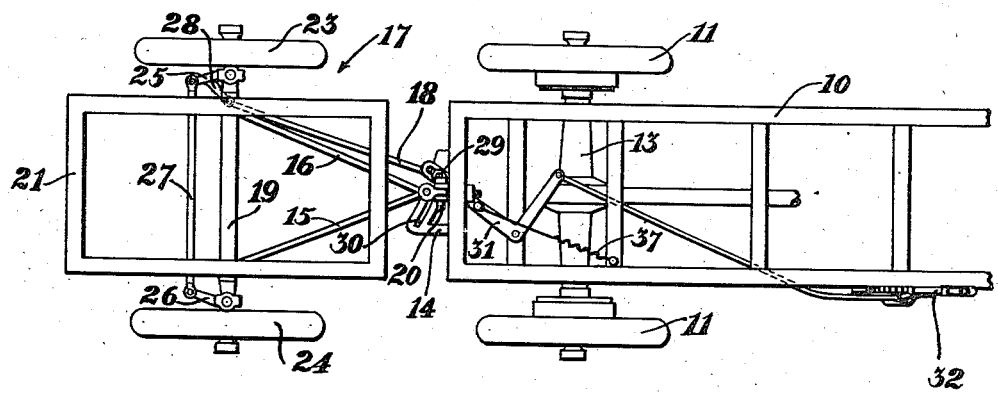
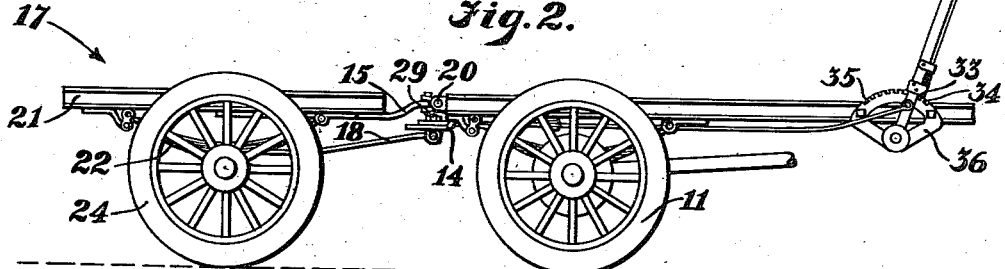
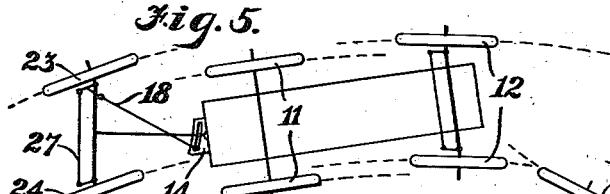
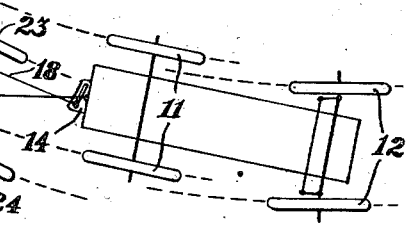
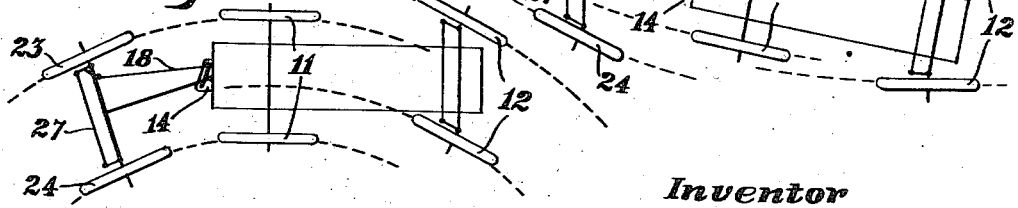
Inventor
Maurice J. Yoder
by Hazard & Miller
Att'ys.

UNITED STATES PATENT OFFICE.

MAURICE J. YODER, OF HEMET, CALIFORNIA.

TRAILER.

1,247,201.  Specification of Letters Patent.  Patented Nov. 20, 1917.

Application filed February 10, 1917. Serial No. 147,896.

*To all whom it may concern:*

Be it known that I, MAURICE J. YODER, a citizen of the United States, residing at Hemet, in the county of Riverside and State of California, have invented new and useful Improvements in Trailers, of which the following is a specification.

This invention relates to a vehicle and particularly pertains to a trailer.

It is an object of this invention to provide a trailer adapted to be connected to a suitable tractor, and which is so constructed that the trailer wheels may be steered independent of the body so as to follow the path of travel pursued by the rear wheels of the tractor.

Another object of this invention is to provide a trailer which may be readily adapted to be backed, the wheels being guided automatically by the movement of the tractor and thereby moved into confined spaces.

Another object of this invention is to provide a trailer which is simply connected to its tractor and which may be easily detached therefrom without the manipulation of various complicated parts.

Another object of this invention is to provide means whereby the road shock delivered to the axle of the trailer will be absorbed within springs and will not be transmitted to the draw-bar mechanism of the trailer.

A further object of this invention is to provide an adjustable control mechanism for determining the relative angular movement of the trailer wheels in relation to the rear wheels of the tractor.

Other objects will appear hereinafter.

The invention is illustrated, by way of example, in the accompanying drawings in which:

Figure 1 is a view in plan illustrating the rear portion of a tractor to which is connected the trailer with which the present invention is concerned.

Fig. 2 is a view in side elevation illustrating the parts disclosed in Fig. 1.

Fig. 3 is a diagrammatical view of the tractor and trailer running gears disclosing the manner in which the trailer wheels conform to the path of travel described by the rear wheels of the tractor.

Fig. 4 is a view similar to Fig. 3 illustrating the trailer steering mechanism as having been reversed in order to dispose the trailer wheels so that they will automatically back along any path of travel to be taken by the tractor.

Fig. 5 is a view similar to Fig. 3 illustrating in a diagrammatical manner another position of the trailer when backing.

Referring more particularly to the drawings, 10 indicates the frame of a tractor, under which are positioned rear wheels 11 and front wheels 12. The rear wheels are rotatably mounted upon an axle 13 and held in constant parallel relation to each other. The front wheels are mounted upon a front axle and held in horizontal swinging relation to each other and the axle, as is common in motor vehicle construction.

The draw-bars 15 and 16 of the trailer 17 are secured together at their forward ends and are connected by a clevis having a vertical pin to a horizontal hinge-pin 20 carried by a hinge member rigidly secured to the frame 10, and serve as the draft tongue for pulling, pushing and guiding the trailer body.

Mounted upon the rear end of the frame 10 is a trailer plate 14 which provides connection for a steering tongue 18 of a trailer 17. The draw-bars 15 and 16 extend outwardly from the pin 20, and are secured at their outer rear ends directly to and beneath the body of the trailer in a rigid manner. The body of the trailer is supported upon a frame 21 which in turn is positioned upon a pair of semi-elliptical springs 22. These springs rest upon the axle 19 of the trailer. This axle is provided with wheels 23 and 24 which are pivoted in the same manner as the front wheels of the tractor. The wheels 23 and 24 are provided with steering knuckle levers 25 and 26, respectively. The lever 26 extends rearwardly and connects with a drag-link 27 at its rear end. The opposite end of this drag-link connects with the rear end of the lever 25, which is similar in shape and angularity to the lever 26. This steering knuckle has the usual side lever 28 formed upon it extending to permit the steering tongue 18 to connect with it at a point directly beneath the line of centers of the axles when in a straight running position.

The opposite end of this link is secured to the plate 14 by a slidable pivot pin 29 which is adapted to be moved along an arcuate slot 30 by means of a slotted bell crank 31. The bell crank 31 is in turn mounted upon a suitable pivotal support upon the frame of the tractor and is operatively connected with a shifting lever 32 positioned within reach of the driver. The lever 32 is fitted with a pawl 33 which may be moved into and out of engagement with notches 34 and 35 upon a sector 36.

When the pawl is in register with the notch 34, the trailer mechanism will be disposed as illustrated in Figs. 1 and 3 of the drawings, and the trailer will follow the tractor in going ahead and when the pawl is in register with the notch 35 the pin 29 will be swung to the opposite end of the slot 30 and will produce the effect disclosed in Figs. 4 and 5 of the drawings and the trailer will precede the tractor in backing in any direction the tractor is steered. This slot along which the pin is adapted to move is so proportioned as to cause the pin 29 to be disposed in a given relation to the steering mechanism of the wheels 23 and 24, that is when the drag-link 18 is disposed as shown in Fig. 1, turning movement of the tractor in either direction will cause the pin 29 to assume a predetermined relation to the pin 20 and thereby actuate the levers 25 and 26 to dispose the wheels 23 and 24 at substantially the same angle as that assumed by the wheels 11 of the rear axle in relation to an arc of turning. In this manner the trailer wheels will at all times be tangent to the arc of turning along which the rear wheels of the tractor travel and will insure that the trailer will accurately follow the path of travel pursued by the vehicle forwardly or backwardly. The conditions and results previously described are attained by the distance between the pins 20 and 29 in relation to the lever 28 of the steering knuckle actuated by the steering tongue 18. The remaining portion of the slot 30 is longer than the portion from the center to the pin 29, as disclosed in Fig. 1, and this arrangement insures that the trailer wheels will be sufficiently cramped to cause the trailer to turn into a given space as the tractor is backed, it being necessary to dispose the slot 30 at an angle to the end frame of the vehicle in order that the trailer wheels may have a straight backward course when directly behind the tractor, in other words, in Fig. 1, the steering tongue 18 may be shifted from the left to the right-hand position without turning the wheels of the trailer.

In operation, the draw-bars of the trailer are secured to the trailer body, as disclosed in the drawings, and thereafter detachably pivoted upon the pin 20 to the plate 14 in a manner to permit the trailer to have horizontal movement in relation to the tractor. Normally, the lever 32 is set so as to maintain the steering tongue 18 and pin 29 in the left-hand end of the slot 30. As the tractor advances, the trailer will be drawn after it and as the tractor turns to the right or the left the steering tongue 18 will be moved forward or backward and will in turn swing the wheels 23 and 24 so that they will track with the rear wheels of the tractor, as particularly disclosed in Fig. 3 of the drawings. In order to maintain the pin 29 in position even though the lever control mechanism were broken, a spring 37 is provided and operates as disclosed in Fig. 1 of the drawings.

When the tractor is to be backed, the lever 32 is swung rearwardly and will in turn swing the bell crank 31 and pin 29 to the right-hand end of the slot 30. When in this position the steering tongue 18 will automatically guide the trailer wheels either way as the tractor assumes any angle or position in backing, as disclosed in Fig. 4 of the drawings. In this position the trailer may be backed in the direction of the arrow —a— of Fig. 4 or in the opposite curve, as shown in Fig. 5, and will allow the trailer to be placed within a confined space, without difficulty, or drawn therefrom when desired.

It is to be observed that when the trailer is backed, as shown in Fig. 4, it will pursue a given course determined by the angular disposition of the tractor in relation thereto, and not by any operation of the lever 32. In other words, the trailer will automatically move in the path shown and described by the mere backing of the tractor.

The draft tongue of the body and the steering tongue of the wheels are so proportioned in length that the wheels of the trailer will square with the trailer body and track with the tractor when the tractor is going straight ahead and the forward end of the steering tongue is at the extreme end of the slot upon the same side of the draft tongue as the rear end. The steering action in backing is due to the changes in angularity and distance caused by shifting the forward end of the steering tongue to the opposite side of the draft tongue, as shown in Figs. 4 and 5. The steering action in going ahead is due to the change in angularity between the rear axle of the tractor and the axle of the trailer, as shown in Fig. 3. The steering tongue is always diagonal to the axle and draft tongue and the action is due to the varying angularity.

When the tractor and trailer are passing along the road, the wheels 23 and 24 will be subjected to road shocks which would be transmitted directly to the draw-bars and their pins if the draw-bars were secured to the axle 19. However, as arranged the draw-bars are fastened to the body of the trailer and the road shock will thus be absorbed within the semi-elliptical springs 22, thus relieving the draw-bars of violent and objectionable strains.

It will thus be seen that the trailer and steering mechanism incorporated therein, as here disclosed, are simple in construction, direct and accurate in their action, and may be easily controlled.

While I have shown the preferred construction of my trailer as now known to me, it will be understood that various changes in the combination, construction, and arrangement of parts may be made by those skilled in the art without departing from the spirit of my invention.

I claim:

1. In a trailer, an axle, steering knuckles at the ends of the axle, wheels upon the steering knuckles, a link connecting the steering knuckles together, a body upon the axle, a draft tongue for the body and adapted to be connected to a tractor to swing on a vertical axis, a steering tongue connected to one steering knuckle, a plate adapted to be fixed to the rear end of the tractor and having a slot extending on both sides of the draft tongue and concentric with that end of the steering tongue which is connected to the steering knuckle, when in normal position to go straight ahead, a pin slidingly mounted in said slot and fixed to the forward end of the steering tongue so that the forward end of the steering tongue may be swung from one side of the draft tongue to the other, and means adapted to be mounted on the tractor for controlling the swinging end of the steering tongue.

2. In a combined tractor and trailer, a trailer comprising an axle, steering knuckles at the ends of the axle, wheels upon the steering knuckles, a link connecting the steering knuckles together, a body upon the axle, a draft tongue rigid with the body and connected to the tractor to swing on a vertical axis, a steering tongue connected to one steering knuckle and extending diagonally to near the forward end of the draft tongue, means fixed upon the tractor having a slot extending on both sides of the draft tongue and concentric with the rear end of the steering tongue when the trailer is straight behind the tractor, a pin slidingly mounted in said slot and fixed to the forward end of the steering tongue so that the forward end of the steering tongue may be swung from one side of the draft tongue to the other, a bell-crank lever mounted upon the tractor for swinging the forward end of the steering tongue, a hand-lever mounted upon the tractor, and a link connecting the hand-lever to the bell-crank lever.

In testimony whereof I have signed my name to this specification.

MAURICE J. YODER.